(12) United States Patent
Tang et al.

(10) Patent No.: US 11,513,280 B2
(45) Date of Patent: Nov. 29, 2022

(54) LIGHT GUIDE PLATE, BACKLIGHT MODULE AND DISPLAY DEVICE

(71) Applicants: HEFEI BOE OPTOELECTRONICS TECHNOLOGY CO., LTD., Hefei (CN); BOE TECHNOLOGY GROUP CO., LTD., Beijing (CN)

(72) Inventors: Hai Tang, Beijing (CN); Liang Gao, Beijing (CN); Jianwei Qin, Beijing (CN); Lu Gao, Beijing (CN); Bo Han, Beijing (CN)

(73) Assignees: HEFEI BOE OPTOELECTRONICS TECHNOLOGY CO., LTD., Anhui (CN); BEIJING BOE TECHNOLOGY DEVELOPMENT CO., LTD., Beijing (CN)

(*) Notice: Subject to any disclaimer, the term of this patent is extended or adjusted under 35 U.S.C. 154(b) by 0 days.

(21) Appl. No.: 16/944,000

(22) Filed: Jul. 30, 2020

(65) Prior Publication Data
US 2021/0132284 A1 May 6, 2021

(30) Foreign Application Priority Data
Nov. 6, 2019 (CN) .......................... 201911075639.5

(51) Int. Cl.
*G02F 1/1334* (2006.01)
*F21V 8/00* (2006.01)

(52) U.S. Cl.
CPC ........... *G02B 6/0061* (2013.01); *G02B 6/005* (2013.01); *G02B 6/0036* (2013.01); *G02F 1/1334* (2013.01)

(58) Field of Classification Search
CPC .... G02B 6/0061; G02B 6/0036; G02B 6/005; G02F 1/1334
See application file for complete search history.

(56) References Cited

U.S. PATENT DOCUMENTS

| 9,581,755 | B2 | 2/2017 | Huang |
| 10,048,560 | B1* | 8/2018 | Mazuir .................... E06B 9/24 |

(Continued)

FOREIGN PATENT DOCUMENTS

| CN | 101191946 A | 6/2008 |
| CN | 101614370 A | 12/2009 |

(Continued)

OTHER PUBLICATIONS

First Chinese Office Action dated Apr. 22, 2020 for corresponding Chinese Patent Application No. 201911075639.5, 19 pages.

(Continued)

*Primary Examiner* — Fatima N Farokhrooz
(74) *Attorney, Agent, or Firm* — Kinney & Lange, P.A.

(57) ABSTRACT

A light guide plate, a backlight module and a display device are disclosed. The light guide plate includes: a first optical path control layer, a second optical path control layer, and a light guide layer that are sequentially stacked. A plurality of prism structures are provided on a side of the first optical path control layer distal to the second optical path control layer. The first optical path control layer, the second optical path control layer, and the light guide layer all extend in a first direction. The first optical path control layer is configured to deflect the light that enters the first optical path control layer from the light guide layer through the second optical path control layer, so that the deflected light passes through the second optical path control layer and is emitted from the light exit surface of the light guide layer.

16 Claims, 13 Drawing Sheets

(56) References Cited

U.S. PATENT DOCUMENTS

| | | | |
|---|---|---|---|
| 10,488,575 B2 | 11/2019 | Liu et al. | |
| 10,705,283 B2 | 7/2020 | Liu et al. | |
| 10,761,259 B2 | 9/2020 | Tang et al. | |
| 2007/0058108 A1* | 3/2007 | Uehara | G02B 6/005 349/86 |
| 2009/0323372 A1 | 12/2009 | Kurihara et al. | |
| 2011/0050127 A1* | 3/2011 | Overluizen | F21V 14/003 315/294 |
| 2011/0299013 A1* | 12/2011 | Ishida | G02B 6/0055 362/607 |
| 2015/0103393 A1* | 4/2015 | Huang | G02B 6/005 359/296 |
| 2018/0156957 A1* | 6/2018 | Larsen | G02B 6/0036 |
| 2018/0180790 A1* | 6/2018 | Kim | G02F 1/133615 |
| 2020/0033525 A1* | 1/2020 | Sugiyama | G02B 6/0038 |
| 2020/0132913 A1* | 4/2020 | Tang | G02B 6/0036 |
| 2021/0208450 A1* | 7/2021 | Wu | G02F 1/1323 |

FOREIGN PATENT DOCUMENTS

| | | |
|---|---|---|
| CN | 101684927 A | 3/2010 |
| CN | 104575269 A | 4/2015 |
| CN | 106997121 A | 8/2017 |
| CN | 107179627 A | 9/2017 |
| CN | 109212660 A | 1/2019 |
| JP | 09292531 A | 11/1997 |
| KR | 1020110033052 A | 3/2011 |
| WO | 2014061510 A1 | 4/2014 |
| WO | 2014061511 A1 | 4/2014 |

OTHER PUBLICATIONS

Second Chinese Office Action dated Jul. 17, 2020 for corresponding Chinese Patent Application No. 201911075639.5, 14 pages.

Chinese Office Action dated Oct. 15, 2020 for corresponding Chinese Patent Application No. 201911075639.5, five pages.

* cited by examiner

LIGHT GUIDE PLATE, BACKLIGHT MODULE AND DISPLAY DEVICE

CROSS-REFERENCE TO RELATED APPLICATION

This application claims the benefit of Chinese Patent Application No. 201911075639.5 filed on Nov. 6, 2019 in the National Intellectual Property Office of China, the whole disclosure of which is incorporated herein by reference.

TECHNICAL FIELD

The present disclosure relates to the field of display technology, in particular to a light guide plate, a backlight module and a display device.

BACKGROUND

With the increasing market demand for personal privacy protection, requirements for smart display of display products are increasing. In current anti-peep products, a reflective layer needs to be provided in a light guide plate (LGP) to reflect light so as to achieve the anti-peep effect. A high-reflective film needs to be coated to form the reflective film so as to achieve the reflective effect, however, the high-reflective film is expensive.

Therefore, reducing the cost of the light guide plate and ensuring the anti-peep effect have become a pressing problem.

SUMMARY

Some embodiments of the present disclosure provide a light guide plate, comprising: a first optical path control layer, a second optical path control layer, and a light guide layer that are sequentially stacked; wherein the light guide layer comprises a light incident surface and a light exit surface, and the light incident surface is configured such that light emitted from a light source enters the light guide layer through the light incident surface; wherein the first optical path control layer is disposed on a side of the light guide layer distal to the light exit surface, the second optical path control layer is disposed between the light guide layer and the first optical path control layer, and a plurality of prism structures are provided on a side of the first optical path control layer distal to the second optical path control layer; wherein the first optical path control layer, the second optical path control layer, and the light guide layer all extend in a first direction, the refractive index of the light guide layer is greater than the refractive index of the second optical path control layer, and the refractive index of the second optical path control layer is smaller than or equal to the refractive index of the first optical path control layer; and wherein the first optical path control layer is configured to deflect the light that enters the first optical path control layer from the light guide layer through the second optical path control layer, so that the deflected light passes through the second optical path control layer and is emitted from the light exit surface of the light guide layer, and an included angle between the light emitted from the light exit surface of the light guide layer and a second direction perpendicular to the first direction is smaller than a preset angle.

In some embodiments, the first optical path control layer comprises a flat portion, the flat portion comprises a first surface close to the second optical path control layer and a second surface distal to the second optical path control layer, and the plurality of prism structures are arranged on the second surface; and at least one of the plurality of prism structures comprises a first bottom surface, a first side surface, a second side surface, the first bottom surface and the second surface are coplanar, the first side surface is farther away from the light incident surface than the second side surface, a first included angle between the first side surface and the first bottom surface is an acute angle, and a second included angle γ between the second side surface and the first bottom surface is an acute angle or a right angle.

In some embodiments, the at least one prism structure further comprises a second bottom surface on a side of the first bottom surface distal to the flat portion, and each of the first side surface and the second side surface intersects both the first bottom surface and the second bottom surface.

In some embodiments, the range of the second included angle γ is $60°≤γ≤90°$.

In some embodiments, a distance between the first bottom surface and the second bottom surface is between 34 μm and 51 μm.

In some embodiments, the plurality of prism structures are continuously arranged on the second surface.

In some embodiments, the plurality of prism structures and the flat portion are an integral structure.

In some embodiments, the light guide layer comprises a body of the light guide layer and a plurality of prisms arranged at intervals on the light exit surface of the light guide layer, and the prisms are arranged on a side of the body of the light guide layer distal to the second optical path control layer, and the prisms are configured to deflect light which propagates in the light guide layer by total reflection so that the light is refracted into the second optical path control layer.

In some embodiments, at least one of the plurality of prisms comprises a third bottom surface, a third side surface, and a fourth side surface, the third bottom surface is parallel to and adjacent to the body of the light guide layer, the third side surface and the fourth side surface both intersect the third bottom surface, the third side surface is farther away from the light incident surface than the fourth side surface, a third included angle α1 between the third side surface and the third bottom surface is an acute angle, and a fourth included angle α2 between the fourth side surface and the third bottom surface is an acute angle or a right angle.

In some embodiments, the range of the third angle α1 is $0.1°≤α1≤10°$, and the range of the fourth angle α2 is $60°≤α2≤90°$.

In some embodiments, the plurality of prisms are elongated and all extend in a third direction perpendicular to both the first direction and the second direction, and the plurality of prisms are arranged at intervals in the first direction.

In some embodiments, distances between two adjacent prisms gradually decrease in the first direction.

In some embodiments, widths of the plurality of prisms in the first direction gradually increase in the first direction.

In some embodiments, the plurality of prisms have a mutually spaced dot-mesh structure, the plurality of prisms are distributed on a side of the body of the light guide plate distal to the second optical path control layer, and a distribution density of the prisms gradually increases in the first direction.

In some embodiments, at least one of the light guide layer and the first optical path control layer is made of organic glass material or polycarbonate material.

In some embodiments, the second optical path control layer comprises water or salt water, and the light guide plate further comprises a sealant located between the light guide layer and the first optical path control layer; and the light guide layer, the first optical path control layer, and the sealant enclose an accommodating space, and the accommodating space is configured to seal and accommodate the water or salt water.

In some embodiments, the second optical path control layer comprises a UV glue.

Some embodiments of the present disclosure provide a backlight module, comprising: the light guide plate according to the above embodiments; a side light source facing the light incident surface; and a scattering control layer on a light exit side of the light guide plate, wherein the scattering control layer is configured to be switchable between a transparent state and an astigmatic state, light which enters the scattering control layer passes through the scattering control layer without substantially changing a traveling direction when the scattering control layer is in the transparent state; and the light which enters the scattering control layer is scattered by the scattering control layer and then exits from the scattering control layer when the scattering control layer is in the astigmatic state.

In some embodiments, the scattering control layer comprises polymer dispersed liquid crystal, the scattering control layer is in the astigmatic state in response to no external electric field applied to the polymer dispersed liquid crystal, and the scattering control layer is in the transparent state in response to the external electric field applied to the polymer dispersed liquid crystal.

Some embodiments of the present disclosure provide a display device, comprising the backlight module according to the above embodiments; and a display panel on a light exit side of the backlight module.

DETAILED DESCRIPTION OF EMBODIMENTS

In order to further explain technical means and effects of the present disclosure to achieve the intended purpose of the invention, specific implementations, structures, characteristics and effects of a light guide plate, a backlight module and a display device provided by the present disclosure will be described in detail below in conjunction with accompanying drawings and preferred embodiments.

Figure 1:
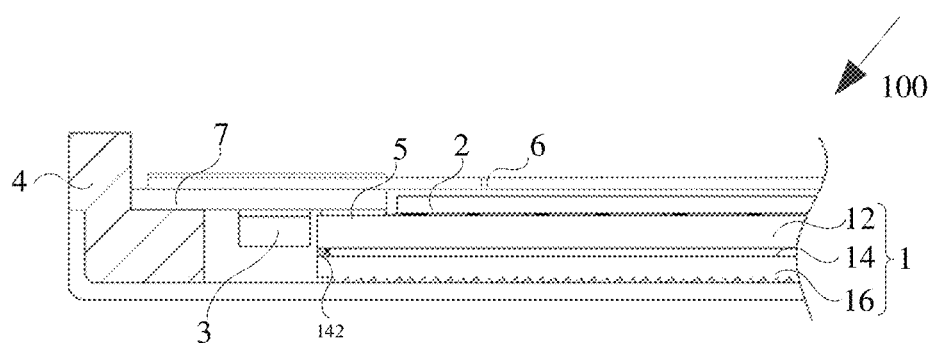
FIG. 1 is a schematic structural view of a backlight module provided by some embodiments of the disclosure.
Figure 2:
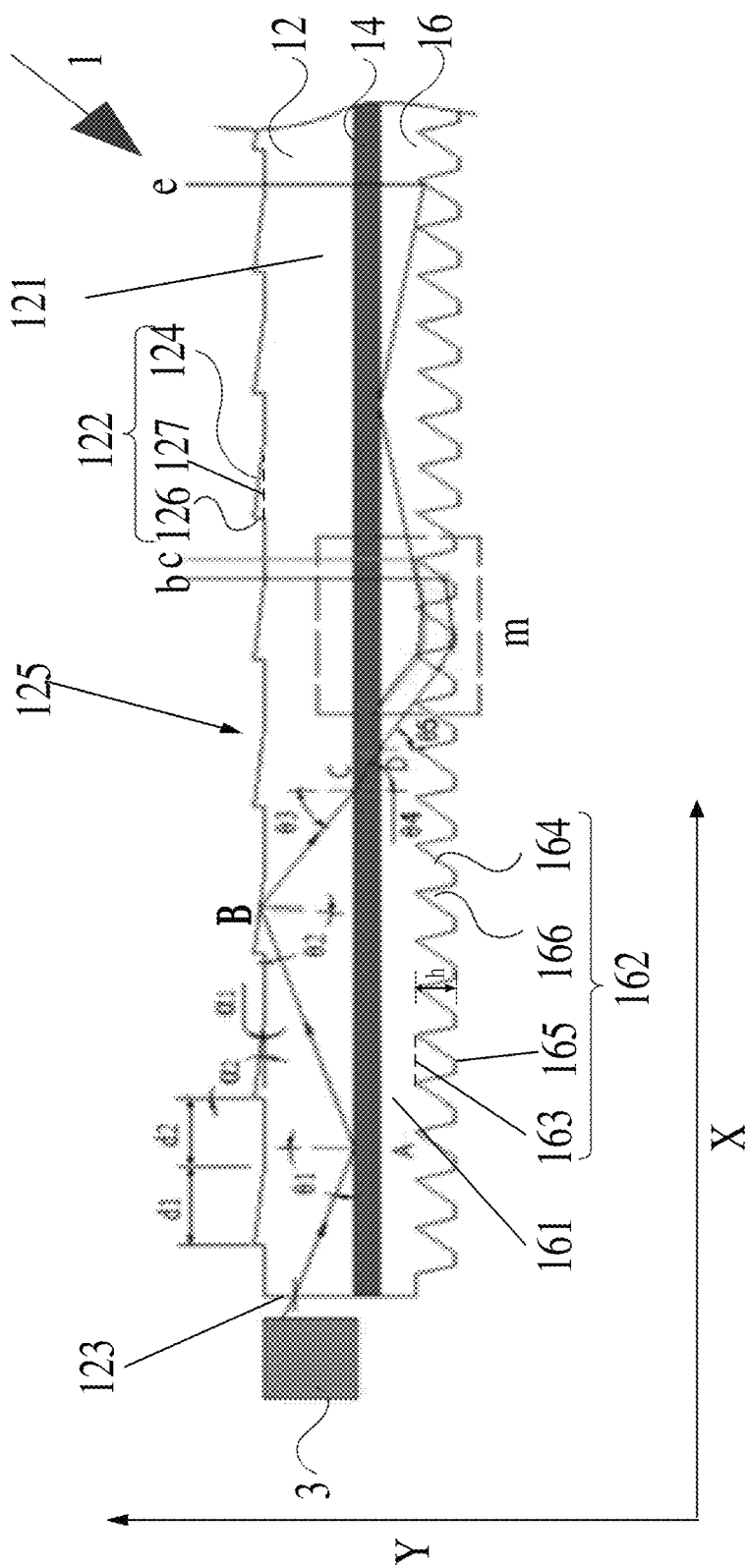
FIG. 2 is a schematic structural view of a light guide plate provided by some embodiments of the disclosure.
Figure 3:
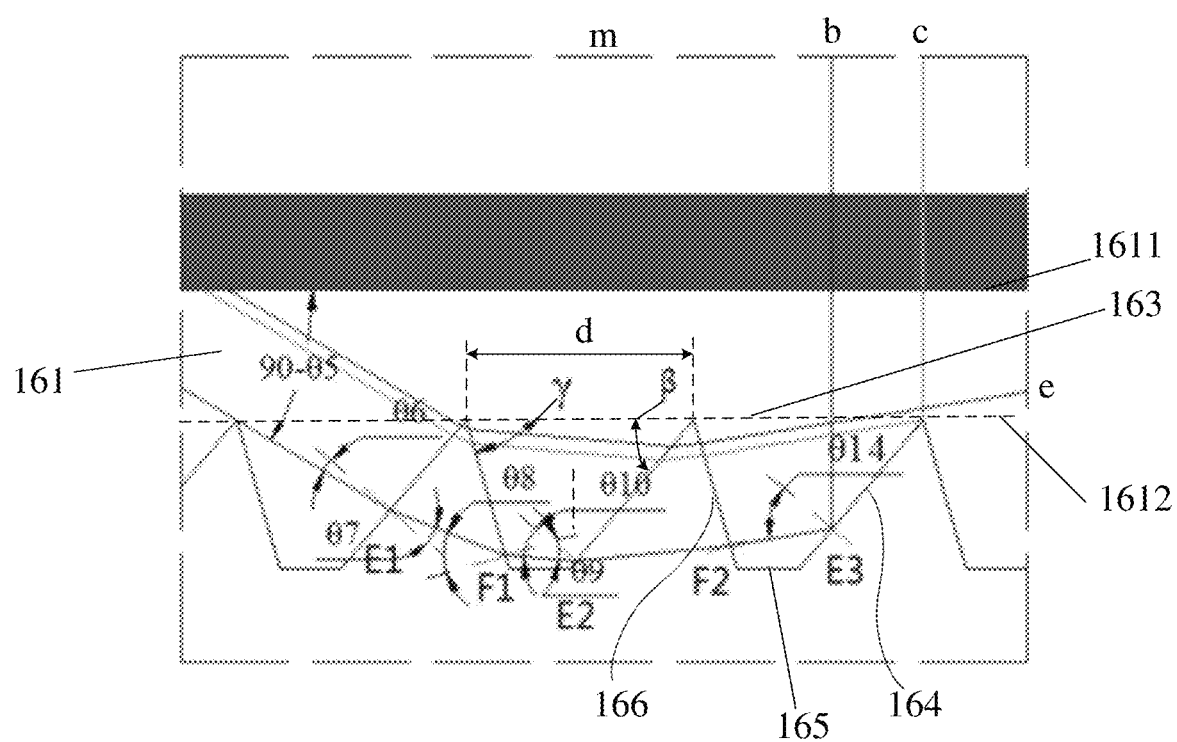
FIG. 3 is a partial enlarged view at m in FIG. 2.

As shown in FIG. 1 to FIG. 3, some embodiments of the present disclosure provide a light guide plate 1, including a light guide layer 12, a first optical path control layer 16, and a second optical path control layer 14.

The first optical path control layer 16 is disposed on a side of the light guide layer 12 away from a light exit surface 125, and the second optical path control layer 14 is disposed between the light guide layer 12 and the first optical path control layer 16. A plurality of prism structures 162 are provided on a side of the first optical path control layer 16 away from the second optical path control layer 14.

The first optical path control layer 16 is configured to deflect light which comes from the light guide layer 12 and the second optical path control layer 14 and is incident onto the first optical path control layer 16, so that light emitted from the light exit surface of the light guide layer 12 has an included angle with regard to a direction perpendicular to an extending direction of the light guide layer 12, and the included angle is smaller than a preset angle. In other words, the light emitted from the light exit surface of the light guide layer 12 is substantially perpendicular to the extending direction of the light guide layer 12. The extension direction of the light guide layer 12 used herein refers to a direction in which an end of the light guide layer 12 close to a light source 3 points to an end of the light guide layer 12 away from the light source 3, as indicated by a first direction X in FIG. 2, and it is also referred to the extending direction X of the light guide layer 12 hereinafter. In other words, the light exit surface 125 of the light guide layer 12 extends away from the light source 3 in the first direction X. As shown in FIG. 2, a second direction Y is perpendicular to the extending direction X of the light guide layer 12, and the second direction Y is substantially perpendicular to a light exit surface (that is, a surface of the light guide layer 12 away from the first optical path control layer 16) of the light guide plate 1. Specifically, the refractive index of the light guide layer 12 is n1, the refractive index of the second optical path control layer 14 is n2, the refractive index of the first optical path control layer 16 is n3, and the refractive index of air is n0, wherein, n1>n2, n3≥n2, and n3>n0.

Some embodiments of the present disclosure provide a light guide plate 1. The light guide plate 1 includes a light guide layer 12, a first optical path control layer 16 and a second optical path control layer 14. The light guide layer 12, the second optical path control layer 14 and the first optical path control layer 16 is stacked in order from top to bottom, and the second optical path control layer 14 is disposed between the light guide layer 12 and the first optical path control layer 16 to assemble the light guide layer 12 and the first optical path control layer 16 together. The light source 3 is a side light source 3. The light source 3 and the light guide layer 12 of the light guide plate 1 are substantially at the same height. The light source 3 emits light on a side close to the light guide plate 1, and the light is incident onto a light incident surface 123 of the light guide layer 12. After the light enters the light guide layer 12, the light may be incident onto a side of the light guide layer 12 close to the second optical path control layer 14. As the refractive index n1 of the light guide layer 12 is greater than the refractive index n2 of the second optical path control layer 14, light is refracted into the second optical path control layer 14 when an incident angle of the light incident on the side of the light guide layer 12 close to the second optical path control layer 14 is smaller than the total reflection angle at an interface between the light guide layer 12 and the second optical path control layer 14. As the refractive index n2 of the second optical path control layer 14 is smaller than or equal to the refractive index n3 of the first optical path control layer 16, the light refracted into the second optical path control layer 14 is further refracted into the first optical path control layer 16. A plurality of prism structures 162 are provided on the side of the first optical path control layer 16 away from the second optical path control layer 14. After the light enters the first optical path control layer 16, it is incident onto the prism structures 162. The prism structures 162 are used to deflect the light, so that an included angle between an exit direction of the light and the second direction Y is smaller than the preset angle, that is, the exit direction of the light is approximately perpendicular to the light exit surface of the light guide layer, so that divergent light is calibrated by means of the first optical path control layer 16 of the light guide plate 1, thereby improving the collimation of the exit light in one-dimensional direction.

Therefore, in the light guide plate 1 provided by the present disclosure, by providing the prism structures 162 in the first optical path control layer 16, the incident light is deflected toward the light exit surface, so that the exit light is emitted toward the light exit surface, that is, the exit light is emitted in a direction approximately perpendicular to the light exit surface, thereby reducing the half-brightness angle and the cut-off angle. In this way, the anti-peep effect is achieved. Moreover, while the anti-peep effect is achieved, it is not necessary to coat the high-reflective film, thereby improving the production efficiency and reducing the production cost. Further, a problem that the high-reflective film may fall off when it encounters water may be avoided, thereby improving the product yield.

The present disclosure will be further described in detail below in conjunction with the drawings and embodiments.

In the embodiments of the present disclosure, the first optical path control layer 16 includes a flat portion 161 that includes a first surface 1611 close to the second optical path control layer 14 and a second surface 1612 distal to the second optical path control layer 14, and the prism structures 162 are stacked on the second surface 1612.

In the embodiments, the first optical path control layer 16 includes a flat portion 161 that includes a first surface 1611 close to the second optical path control layer 14 and a second surface 1612 distal to the second optical path control layer 14, and the prism structures 162 are stacked on the second surface 1612, so that the light enters the flat portion 161 from the second optical path control layer 14 and enters the prism structures 162 stacked on the second surface 1612 from the flat portion 161. In this way, the light is deflected by the prism structures 162 so that the exit direction of the light faces toward the light exit surface, that is, the exit direction of the light is approximately perpendicular to the light exit surface. The light is emitted from the light guide plate 1 through the second optical path control layer 14 and the light guide layer 12. In this way, the light guide plate 1 may deflect the light through the first optical path control layer 16, thereby improving the collimation of the exit light in one-dimensional direction.

In the embodiments of the present disclosure, the prism structure 162 includes a first bottom surface 163, a second bottom surface 165, a first side surface 164, and a second side surface 166. The first bottom surface 163 and the second bottom surface 165 are disposed opposite to each other. The first side surface 164 is further away from the light source 3 than the second side surface 166. Each of the first side surface 164 and the second side surface 166 intersects both the first bottom surface 163 and the second bottom surface 165. A first included angle $\beta$ between the first side surface 164 and the first bottom surface 163 is an acute angle, an included angle $\gamma$ between the second side surface 166 and the first bottom surface 163 is an acute angle or right angle. The first bottom surface 163 overlaps the second surface 1612 of the flat portion 161, that is, the first bottom surface 163 is coplanar with the second surface 1612 of the flat portion 161.

In some embodiments, the flat portion 161 and the prism structures 162 are an integral structure. In this case, a boundary between the flat portion 161 and the prism structures 162 may be represented by a horizontal dashed line as shown in FIG. 3.

In some embodiments, the prism structure 162 has an inverted trapezoid shape, as shown in FIG. 3.

In some embodiments, the prism structure 162 includes a first bottom surface 163, a second bottom surface 165, a first side surface 164, and a second side surface 166. The first bottom surface 163, the second bottom surface 165, the first side surface 164, and the second side surface 166 are all planes, a first included angle $\beta$ between the first side surface 164 and the first bottom surface 163 is an acute angle, and a second included angle $\gamma$ between the second side surface 166 and the first bottom surface 163 is an acute angle or a right angle. When the light is refracted into the prism structures 162 of the first optical path control layer 16 from the second optical path control layer 14, the light is firstly incident onto the first side surface 164 to be refracted. Since the first side surface 164 is farther away from the light source 3 than the second side surface 166 and there is an air gap between two adjacent prism structures 162, the light from the prism structure 162 is refracted by the air to enter the next adjacent prism structure 162. Since the refractive index of the first optical path control layer 16 is greater than that of the air, that is, the light enters an optically thin medium from an optically dense medium, an incident angle onto the first side surface 164 and an exit angle from the first side surface 164 are respectively located on both sides of the normal, and the incident angle is smaller than the exit angle. The light is deflected in the counterclockwise direction, that is, the light is deflected toward the second optical path control layer 14. Then the light is refracted into the second side surface 166 of another next adjacent prism structure 162. At this time, the light enters the prism structure 162 from the air, that is, the light enters the optically dense medium from the optically thin medium, so that the exit angle is closer to the normal direction relative to the incident angle, so that the second side surface 166 of the another next adjacent prism structure 162 may converge the light. In this way, the light in any direction is converged toward the normal direction, so that the light is further deflected toward the light exit surface. An included angle between the light which is incident onto the first side surface 164 and the normal at the first side surface 164 is increased. Then, the light is incident onto the first side surface 164 of another further prism structure 162. At this time, if an included angle between the light and the normal at the first side surface 164 is greater than the total reflection angle at the interface between the first side surface 164 and the air, the light is totally reflected on the first side surface 164 and is emitted toward the light exit surface, and the exit light is approximately perpendicular to the light exit surface. If the included angle between the light and the normal of the first side surface 164 is still smaller than the total reflection angle between the first side surface 164 and the air, the light continues to be refracted into the next prism structure 162 until an included angle between the light and the normal at the first side surface 164 of one prism structure 162 is greater than the total reflection angle between the first side surface 164 and the air, then the light is emitted from the light guide plate 1 toward the light exit surface. In some embodiments, the prism structure 162 is a trapezoidal prism structure 162, so that the thickness of the light guide plate 1 may be reduced, thereby reducing the thickness of the backlight module 100, and avoiding the damage of the prism structure at a sharp corner.

As shown in FIG. 2, in the embodiments of the present disclosure, the light guide layer 12 includes a body 121 of the light guide layer 12 and a plurality of prisms 122 which are located on the light exit surface of the light guide layer 12 and spaced apart from each other. The prisms 122 are configured to deflect light which propagates in the light guide layer by means of the total reflection so that the light is refracted into the second optical path control layer 14.

In some embodiments, the light guide layer 12 includes a body 121 of the light guide layer 12 and a plurality of spaced prisms 122. The body 121 of the light guide layer 12 includes a third surface close to the second optical path control layer 14, and a surface of the second optical path control layer 14 close to the body 121 of the light guide layer 12 is a fourth surface, and a surface of the second optical path control layer 14 close to the first optical path control layer 16 is a fifth surface. Light emitted from the light source 3 is incident onto the third surface of the body 121 of the light guide layer 12. If an incident angle of the light which is incident onto the interface between the body 121 of the light guide layer 12 and the second optical path control layer 14 is greater than the total reflection angle at the interface between the body 121 of the light guide layer 12 and the second optical path control layer 14, the incident light is totally reflected, and then reflected onto the prism 122 on the light exit surface of the light guide layer 12. The prism 122 includes a third inclined surface 124. An angle formed by the third inclined surface 124 and the third surface is an acute angle. The third inclined surface 124 which has an angle relative to the third surface deflects the light toward a vertical direction. In this way, the light is incident onto and passes through the third inclined surface 124, then the light is incident onto the third surface again, so that an included angle between the light and the second direction Y becomes smaller, that is, the incident angle on the interface between the light guide layer 12 and the second optical path control layer 14 may become smaller. The light may be reflected one or more times by the prisms 122, until the included angle between the light incident onto the third surface and the vertical direction of the second optical path control layer 14 is smaller than the total reflection angle at the interface between the light guide layer 12 and the second optical path control layer 14, and then the light is refracted into the second optical path control layer 14. In the embodiments of the present disclosure, the plurality of prisms 122 are arranged on the light exit surface of the light guide layer 12, so that the included angle between the light incident onto the third surface of the body 121 of the light guide layer 12 and the second direction Y is gradually reduced until the included angle between the light incident onto the third surface and the second direction Y is smaller than the total reflection angle at the interface between the light guide layer 12 and the second optical path control layer 14, so that the light may enter the first optical path control layer 16 through the second optical path control layer 14.

Figure 6:
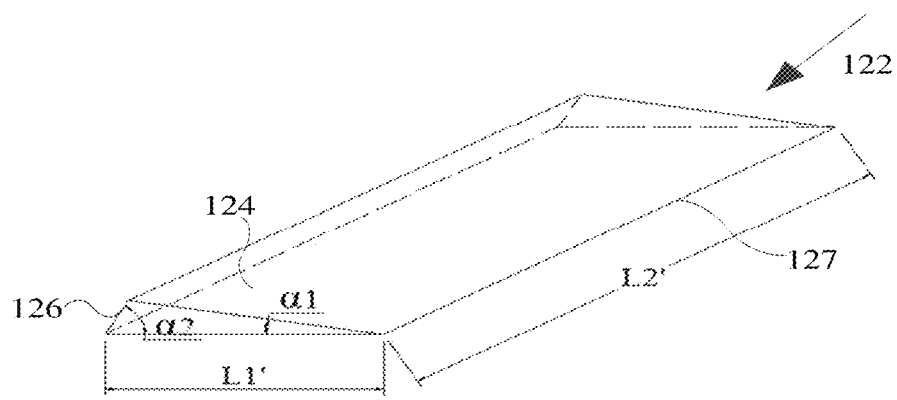
FIG. 6 is a schematic structural view of a prism with a columnar structure provided by some embodiments of the disclosure.

In some embodiments, as shown in FIG. 2 and FIG. 6, the prism 122 includes a third bottom surface 127, a third side surface 124, and a fourth side surface 126. The third bottom surface 127 is parallel to and adjacent to the body 121 of the light guide layer 12. The third side surface 124 and the fourth side surface 126 both intersect with the third bottom surface 127. The third side surface 124 is farther away from the light incident surface 123 than the fourth side surface 126. The third included angle $\alpha 1$ between the third side surface 124 and the third bottom surface 127 is an acute angle, and the fourth included angle $\alpha 2$ between the fourth side surface 126 and the third bottom surface 127 is an acute angle or a right angle. In some embodiments, the range of the third included angle $\alpha 1$ is $0.1° \leq \alpha 1 \leq 10°$, and the range of the fourth included angle $\alpha 2$ is $60° \leq \alpha 2 \leq 90°$.

The third bottom surface 127 is parallel to the third surface of the body 121 of the light guide layer 12, and an included angle formed by the third side surface 124 and the third surface is equal to the third included angle $\alpha 1$, and it is also denoted by $\alpha 1$ below. An included angle formed by the fourth side surface and the third surface 124 is equal to the fourth included angle $\alpha 2$, and it is also denoted by $\alpha 2$ below. In some embodiments, the prisms 122 and the body 121 of the light guide layer 12 are an integral structure. In this case, a boundary between the flat portion 161 and the prism structures 162 may be represented by a horizontal dashed line as shown in FIG. 2, and it may be considered that the third bottom surface 127 is located on the horizontal dashed line.

In some embodiments, the third inclined surface 124 may be a flat surface, of course, it may be a curved surface. When the third inclined surface 124 is a flat surface, a reduced angle by each third inclined surface 124 is controllable, and the reduced angle is twice the included angle $\alpha 1$ formed by the third inclined surface 124 and the third surface, so that it is conducive to subsequent calculations and applications. The prism 122 further includes a fourth inclined surface 126. The fourth inclined surface 126 intersects the third inclined surface 124, and the fourth inclined surface 126 is closer to the light source 3 relative to the third inclined surface 124. An included angle $\alpha 2$ formed by the fourth inclined surface 126 and the third surface is an acute angle or a right angle.

As shown in FIG. 2, in some embodiments, the light source 3 emits light from a side close to the light guide plate 1, and the light is incident onto the third surface of the body 121 of the light guide layer 12. The refractive index n1 of the light guide layer 12 is greater than the refractive index n2 of the second optical path control layer 14, and the total reflection angle at the interface between the light guide layer 12 and the second optical path control layer 14 is $\theta$. If an angle $\theta 1$ between the incident light and the second direction Y is smaller than the total reflection angle $\theta$, the light is refracted into the second optical path control layer 14. If the angle $\theta 1$ between the incident light and the second direction Y is greater than the total reflection angle $\theta$, the light incident onto the third surface may be totally reflected at a point A, and then reflected onto the prism 122 at a point B. An incident angle at the point B is $\theta 2$. The prism 122 includes a third inclined surface 124. The angle $\alpha 1$ between the third inclined surface 124 and the third surface is an acute angle. The light is incident onto and passes through the third inclined surface 124, and is refracted onto the third surface again, so that the included angle between the light and the second direction Y becomes smaller, so that the prism 122 may deflect the incident light. In this way, the incident angle θ3 at a point C on the third surface on which the light is incident through the point B is smaller than θ1. If the incident angle θ3 at the point C is smaller than the total reflection angle θ, the light enters the second optical path control layer 14 from the point C. Since the refractive index of the second optical path control layer 14 is smaller than or equal to the refractive index of the first optical path control layer 16, the light refracted into the second optical path control layer 14 may be further refracted into the first optical path control layer 16.

As shown in FIG. 2, in the embodiments, the included angle between the third inclined surface 124 and the third surface is α1, the refractive index of the light guide layer 12 is n1, the refractive index of the second optical path control layer 14 is n2, and the total reflection angle at the interface between the light guide layer 12 and the second optical path control layer 14 is θ, wherein $$\theta = \arcsin\left(\frac{n2}{n1}\right).$$

If the included angle θ1 between the light incident onto the third surface and the second direction Y is smaller than θ, the light enters the first optical path control layer 16 through the second optical path control layer 14. If the included angle θ1 between the light incident onto the third surface and the second direction Y is greater than θ, as indicated by light b in FIG. 2, the incident light is totally reflected at the point A and reaches the point B on the third inclined surface 124 of the prism 122. The incident angle of the incident light at the point B is θ2. After passing through the point B, the light is reflected onto the third surface. The included angle between the light and the second direction Y, that is, the incident angle at the point C is θ3. Due to the propagation through the third inclined surface 124, θ3 is decreased by 2α1, that is, θ3=θ1−2α1. If θ3<θ, light may enter the first optical path control layer 16 from the point C through the second optical path control layer 14. If θ3>θ, the light may continue to be totally reflected and pass through another prism 122, so that the incident angle of the light incident onto the second optical path control layer 14 is continuously reduced by 2α1 each time. The final incident angle may be smaller than the total reflection angle θ at the interface between the light guide layer 12 and the second optical path control layer 14. In this way, the light enters the second optical path control layer 14, and then enters the first optical path control layer 16. Therefore, the included angle α1 formed by the third inclined surface 124 and the third surface determines the deflection efficiency and the concentration of the light, so that the light in the light guide layer 12 that can enter the second optical path control layer 14 fluctuates in a small angle range, and the fluctuation range is θ3±α1. An included angle between the light entering the first optical path control layer 16 and the second direction Y is θ5. Therefore, the following formula (1) and formula (2) may be obtained:

$$\theta3 = \arcsin\left(\frac{n2}{n1}\right) + \alpha1 \qquad \text{formula (1)}$$

$$\theta5 = \arcsin\left(\frac{n1}{n3}\sin\left(\arcsin\left(\frac{n2}{n1}\right) + \alpha1\right)\right) \qquad \text{formula (2)}$$

That is, the included angle α1 formed by the third inclined surface 124 and the third surface determines the range of the incident angle of the light incident onto the first optical path control layer 16 and the angular deflection efficiency of the light in the light guide layer 12. As the angle α1 becomes smaller, the light entering the first optical path control layer 16 has higher concentration and collimation, but has lower deflection efficiency. On the contrary, as the angle α1 becomes larger, the light entering the first optical path control layer 16 has lower concentration and collimation, but has higher deflection efficiency. When α1 is set between 0.1° and 10°, the light entering the first optical path control layer 16 may have good concentration and collimation, and high deflection efficiency.

Optionally, 1°≤α1≤5°.

Optionally, α1=2°. Through taking into account the concentration, collimation and deflection efficiency of the light entering the first optical path control layer 16 comprehensively, the overall effect is the best when α1=2°.

In some embodiments, the prism structure 162 includes a first side surface 164 and a second side surface 166, and the prism structure 162 has an inverted trapezoidal structure, that is, the first side surface 164 and the second side surface 166 are both planes. When the light is refracted into the first optical path control layer 16 from the second optical path control layer 14, the light is incident onto the first side surface 164 to be refracted. Since the refractive index of the first optical path control layer 16 is greater than that of the air, that is, the light enters an optically thin medium from an optically dense medium, an incident angle onto the first side surface 164 and an exit angle from the first side surface 164 are respectively located on both sides of the normal on the first side surface 164, and the incident angle is smaller than the exit angle. The light is deflected in the counterclockwise direction, that is, the light is deflected toward the light exit surface. Then the light passes through the second side surface 166 of another next adjacent prism structure 162. At this time, the light enters the prism structure 162 from the air, that is, the light enters the optically dense medium from the optically thin medium, so that the exit angle on the second side surface 166 is closer to the normal direction on the second side surface 166 relative to the incident angle, so that the second side surface 166 may converge the light. In this way, the light in any direction is converged toward the normal direction, so that the light is further deflected toward the light exit direction. An included angle between the light which is incident onto the first side surface 164 of the another next prism structure 162 and the normal at the first side surface 164 is increased. At this time, if an included angle between the light and the normal at the first side surface 164 is greater than the total reflection angle at the interface between the first side surface 164 and the air (that is, the total reflection angle at the interface between the prism structure 162 and the air), the light is totally reflected on the first side surface 164 and is emitted toward the light exit surface, and the exit light is approximately perpendicular to the second optical path control layer 14, that is, the exit light propagates substantially in the second direction Y. Then, the light is emitted from the light guide plate 1. If the included angle between the light and the normal at the first side surface 164 is still smaller than the total reflection angle at the interface between the first side surface 164 and the air, the light continues to be refracted into the next prism structure 162 until an included angle between the light and the normal at the first side surface 164 is greater than the total reflection angle between the first side surface 164 and the air, then the light is emitted from the light guide plate 1 toward the light exit surface.

In some embodiments, an included angle formed by the second side surface 166 and the first bottom surface 163 is γ, and 60°<γ≤90°. For example, the second side surface 166 is substantially vertical, and the light which is incident onto the second side surface may not be subjected to the total reflection due to the substantially vertical second side surface 166.

As shown in FIG. 3, in some embodiments, after the light enters the first optical path control layer 16 from the second optical path control layer 14, the light that enters the first optical path control layer 16 is firstly incident at point E1 of the first side surface 164 of the first prism structure 162. An included angle between the incident light and a direction perpendicular to the first side surface 164 is θ6, that is, an included angle between the incident light and the normal at the first side surface 164 is θ6. The refractive index of the first optical path control layer 16 is n3, the refractive index of air is 1, and the refractive index of the first optical path control layer 16 is greater than the refractive index of air. The total reflection angle at the interface between the first optical path control layer 16 and the air is k. Therefore, the following formula (3) and formula (4) may be obtained.

$$\beta = \theta 5 - \theta 6 \quad \text{formula (3)}$$

$$\lambda = \arcsin\left(\frac{1}{n3}\right) \quad \text{formula (4)}$$

When the included angle θ6 between the light incident at point E1 and the direction perpendicular to the first side surface 164 is greater than λ, the light may be totally reflected at point E1, so that the light may pass through the second optical path control layer 14 and the light guide layer 12 and is then emitted substantially in the second direction Y, so as to complete the emitting of the light. As shown in the light b in FIG. 2 and FIG. 3, the included angle θ6 between the light incident at point E1 and the direction perpendicular to the first side surface 164 is smaller than λ, the light incident at point E1 is located in a counterclockwise direction relative to the normal perpendicular to the first side surface 164. Since the light emitted from point E1 enters the optically thin medium from the optically dense medium, the incident light and the exit light are located on both sides of the normal, respectively, and the exit light will be deflected in a direction away from the normal, that is, the exit light is deflected toward the light exit surface. An included angle between the exit light and the normal perpendicular to the first side surface 164 is θ7. The first deflection angle is Δθ1. Then the light is incident at a point F1 on the second side surface 166 of the second prism structure 162, and the light is deflected after the light is incident onto the point F1 on the second side surface 166. At this time, the light passes from the optically thin medium to the optically dense medium, so that the exit light is converged in the normal direction perpendicular to the second side surface 166. At this time, an included angle between the incident light and the normal perpendicular to the second side surface 166 is θ8, and an included angle between the exit light and the normal perpendicular to the second side surface 166 is θ9, the second deflection angle is Δθ2. Therefore, the following formula (5), formula (6), formula (7) and formula (8) may be obtained.

$$\Delta\theta 1 = \theta 7 - \theta 6 = \arcsin(n3 \times \sin\theta 6) - \theta 6 \quad \text{formula (5)}$$

$$\theta 8 = \pi - \theta 5 - \gamma - \Delta\theta 1 \quad \text{formula (6)}$$

$$\theta 9 = \arcsin\left(\frac{1}{n3}\sin\theta 8\right) \quad \text{formula (7)}$$

$$\Delta\theta 2 = \theta 8 - \theta 9 \quad \text{formula (8)}$$

Then, the light is incident at a point E2 on the first side surface 164 of the second prism structure 162. At this time, an included angle between the light and the normal perpendicular to the first side surface 164 of the second prism structure 162 is θ10. θ10=θ6+Δθ1+Δθ2. If θ10 is still smaller than λ, the light may continue to be refracted to achieve light deflection. When the light passes through the first side surface 164 for the $n^{th}$ (n=1, 2, 3 ... n) times, that is, when the light is incident onto the first side surface 164 of the $n^{th}$ prism structure 162, the incident angle is θ(2+4n), where (2+4n) represents a serial number. Therefore, the following formula (9) may be obtained.

$$\theta(2+4n) = \theta 6 + \sum_{i=0}^{2(n-1)} \Delta\theta(i) \quad \text{formula (9)}$$

In the formula (9), Δθ0=0. When the light passes through n prism structures 162, θ(2+4n)>λ, the light is totally reflected and is emitted from the light guide plate 1 toward the light exit surface. A preset angle between the exit light that is totally reflected on the first side surface 164 of the prism structure 162 and the second direction Y is σ. A total deflection angle from the light which enters the first optical path control layer 16 to the light which is emitted from the first optical path control layer 16 through the total reflection may be defined as a deflection angle. The deflection angle includes a theoretical deflection angle and an actual deflection angle. The theoretical deflection angle is a theoretical deflection angle from the incident light entering the first optical path control layer 16 to the light exiting from a preset direction, and it is labeled as $\Delta\theta_{theoretical\ deflection\ angle}$. Therefore, the following formula (10) may be obtained.

$$\Delta\theta_{theoretical\ deflection\ angle} = \pi - \theta 5 + \sigma \quad \text{formula (10)}$$

The actual deflection angle is an actual deflection angle from the incident light entering the first optical path control layer 16 to the light exiting from a preset direction. The actual deflection angle indicates a value of the actual defined angle of the light which is totally reflected on the first side surface 164 of the $n^{th}$ prism structure 162 relative to the light which is incident onto the first side surface 164 of the first prism structure 162. The actual deflection angle may be labeled as $\Delta\theta_{actual\ deflection\ angle}$. Therefore, the following formula (11) may be obtained.

$$\Delta\theta_{actual\ deflection\ angle} = \\ \sum_{i=0}^{2(n-1)} \Delta\theta(i) + \pi - 2\times\theta(2+4n) = \pi - \theta 6 - \theta(2+4n) \quad \text{formula (11)}$$

Figure 13:
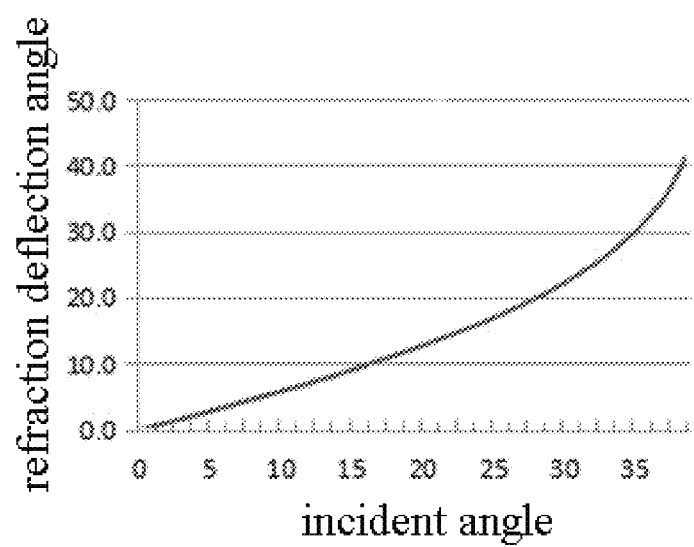
FIG. 13 is a graph of incident angle and deflection angle provided by some embodiments of the disclosure.

In addition, the refraction deflection angle is an absolute value of a difference between the incident angle and the exit angle, and the refraction deflection angle is proportional to the incident angle. The greater the incident angle is, the greater the refraction deflection angle is. Taking a refraction process in which the light propagates from the prism structure 162 to the air as an example, the refractive index n3 of the prism structure 162 is 1.582, and the refractive index n of air is 1. According to the formula (4), it may be obtained that λ=39.2°. In this example, a relationship between the refraction deflection angle and the incident angle shown in FIG. 13 may be obtained. It can be obtained from FIG. 13 that the refraction deflection angle is increased as the incident angle is increased. Although the great refraction deflection angle may improve a deflection efficiency, a deflection accuracy of the light may be lowered. Therefore, a value of the refraction deflection angle needs to be considered comprehensively, so that the refraction deflection angle is smaller than 10°, and an initial incident angle θ6 in the first optical path control layer 16 is smaller than 15°.

Then, a value of γ may be determined close to 90°. In conjunction with the formula (2), formula (3), formula (5), formula (6), formula (7), formula (8), formula (9), formula (10) and formula (11), when the actual deflection angle is equal to the theoretical deflection angle, a value of the incident angle θ6 may be calculated. The value of the incident angle θ6 may have multiple solutions, and the angle θ6 corresponding to the optimal solution is recorded as an effective incident angle. According to the formula (3), a value of β may be obtained. If the above method cannot obtain the effective incident angle θ6, the value of γ may be reduced, and the above method may be repeated until the effective incident angle θ6 is obtained. The values of β and γ obtained above are values of the included angle formed by the first side surface 164 and the first bottom surface 163 in the prism structure 162, and the included angle formed by the second side surface 166 and the first bottom surface 163 in the prism structure 162, respectively. In this way, the obtained totally reflected light is closest to the preset direction. If σ=0°, the collimation of the exit light is the best, and the exit light is basically emitted perpendicularly to the second optical path control layer 14, that is, in the second direction Y, thereby achieving a precise anti-peep effect.

In addition, an actual prism structure 162 may have a machining deviation, for example, there is a tolerance of ±3°, and a difference between the actual deflection angle and the theoretical deflection angle is less than ±15°. According to this relationship, the optimal solution of θ6 may be determined.

In some embodiments, as indicated by light b in FIG. 2 and FIG. 3, θ10 is still smaller than λ, the light may continue to be refracted to achieve light deflection. Since the light enters the optically dense medium from the optically thin medium, the light is deflected in a direction away from the normal, that is, is deflected toward the light exit surface again, thereby reaching F2 on the second side surface 166 of the third prism structure 162. The light continues to be deflected, the light enters the optically dense medium from the optically thin medium, and the light is deflected in a direction close to the normal, that is, the light is deflected again to the direction of the light exit surface and reaches E3 on the first side surface 164 of the third prism structure 162. At this time, an included angle between the light and the normal perpendicular to the first side surface 164 is θ14. If θ14>λ, the light is totally reflected at E3, so that the light may be emitted from the light guide plate 1 through the first optical path control layer 16 and the light guide layer 12 to complete the exit of the light. The light may be deflected twice after passing through one prism structure 162. The included angle between the light and the normal at the first side surface 164 of each of the first prism to the third prism may satisfy θ6<θ10<θ14. If θ14>λ, the light may be totally reflected on the first side surface 164 and may be emitted from the light guide plate 1 perpendicularly to the second optical path control layer 14, that is, the light is emitted from the light guide plate 1 perpendicularly to the light exit surface. As shown in FIG. 2 and FIG. 3, light c and light d are two other types of light. Both light c and light e are emitted in a direction perpendicular to the light exit surface so as to realize the anti-peeping effect.

In some embodiments of the present disclosure, the second optical path control layer 14 include pure water or salt water sealed by sealant 142;

The refractive index n2 of the second optical path control layer 14 is smaller than or equal to 1.41.

Figure 12:
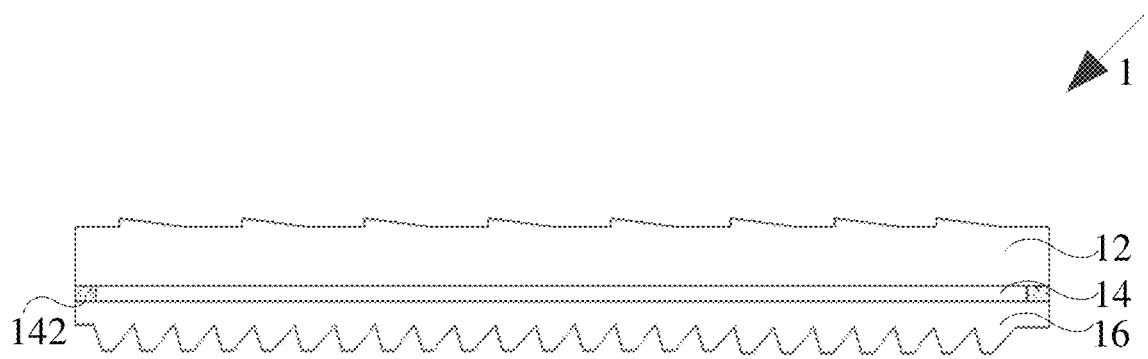
FIG. 12 is a schematic view of a light guide plate provided by some embodiments of the disclosure.

In some embodiments, the second optical path control layer 14 may be made of UV glue with a low refractive index, and a certain thickness of UV glue is coated on a lower surface of the light guide layer 12 or an upper surface of the first optical path control layer 16. Then a laminated light guide plate 1 is obtained through a vacuum fully attached process and a UV curing process. However, the UV glue is too viscous so that it is difficult to bond the light guide layer 12 and the first optical path control layer 16, resulting in low bonding yield. Moreover, the UV glue is costly. The second optical path control layer 14 provided by some embodiments of the present disclosure may use pure water or salt water instead of UV glue. As shown in FIG. 12, a layer of sealant 142 may be coated at a perimeter on the lower surface of the light guide layer 12 or on the upper surface of the first optical path control layer 16, the width of the sealant is about 0.5 mm (the width may be adjusted according to requirements), and the thickness is 1-50 μm. Then the pure water or salt water is dropped. Then the light guide layer 12 and the first optical path control layer 16 is bonded, and the sealant is cured, so as to obtain a laminated light guide plate 1, thereby avoiding the difficulty of bonding due to excessive viscosity and achieving low cost.

In some embodiments, the second optical path control layer 14 may also be a pure water layer sealed by a sealant. The water has good fluidity, and the sample bonded by the water layer has good uniformity. The refractive index of water is 1.33, so that it may meet the requirements of anti-peep design, and the cost is low. When the second optical path control layer 14 is a water layer, a range of test angle between −4 degrees and 2 degrees is a range in which an angular brightness of the laminated sample is relatively large, for example, when the test angle is at −2 degrees, the angular brightness which is about 9500 nit is maximal. According to the actually measured data, it can be seen that the water layer may meet the low refractive index requirement of the anti-peep design of the light guide plate 1.

Optionally, the second optical path control layer 14 is a salt water layer sealed by a sealant, which may avoid the problem of pure water freezing below 0° so as to broaden the use temperature of the product. In addition, NaCl salt water may be used to reduce the solidification temperature. For example, when NaCl content is 23% by mass, the solidification temperature is −21° C. and the refractive index is 1.376, which may still meet the anti-peep design.

Figure 11:
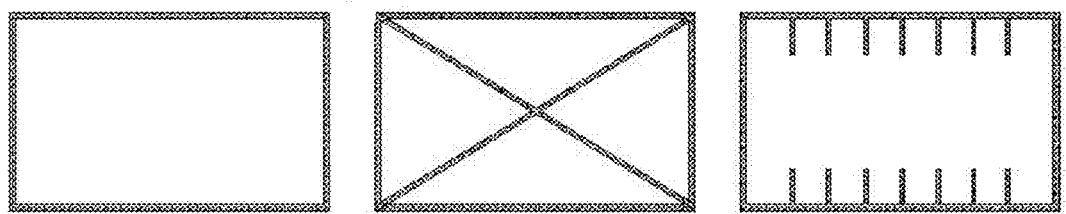
FIG. 11 shows the three coating methods of sealant provided by the embodiments of the disclosure.

As shown in FIG. 11, there are three coating methods for the sealant provided in the present disclosure, and the specific coating methods include but are not limited to these three methods.

In some embodiments of the present disclosure, a distance between the first surface 1611 and the second surface 1612 of the flat portion 161 in the second direction Y is greater than or equal to zero. In some embodiments, a distance h between the first bottom surface and the second bottom surface in the second direction Y is between 34 µm and 51 µm.

As shown in FIG. 2 and FIG. 3, in some embodiments, $$h_{max} = \frac{d\ \sin\beta \sin\gamma}{\sin(\pi - \beta - \gamma)};$$

$$h_1 = \frac{d\ \cos(\theta 5)\ \sin\gamma}{\sin(\theta 5 + \gamma - 90)}.$$

It is known that $\theta 5=55.69°$, $\gamma=90°$, $\beta=45.5°$, d is the width of the prism structure 162, d=50 µm, thus it may be calculated according to the above formula:

$h_{max}$=51 µm, $h_1$=34 µm, wherein $h_{max}$ is the maximum distance between the first bottom surface 613 and the second bottom surface 615 in the second direction Y, $h_1$ is the minimum distance between the first bottom surface 613 and the second bottom surface 615 in the second direction Y. Therefore, the vertical distance h between the first bottom surface and the second bottom surface satisfies 34 µm≤h≤51 µm.

In the embodiments of the present disclosure, a plurality of the prism structures 162 are continuously and periodically arranged on the second surface 1612.

In the embodiments, a plurality of prism structures 162 are continuously arranged on the second surface 1612, so that the light is refracted by the first prism structure 162, passes through the air and immediately enters the next prism structure 162, to prevent the light from leaking at a side of the first optical path control layer 16 away from the second first optical path control layer 14. Moreover, the continuously arranged prism structures 162 ensure the stability of the light deflection angle. An included angle between the first side surface 164 of any one of the prism structures 162 and the second side surface 166 of the adjacent prism structure 162 is opened in a direction away from the light exit surface.

Figure 4:
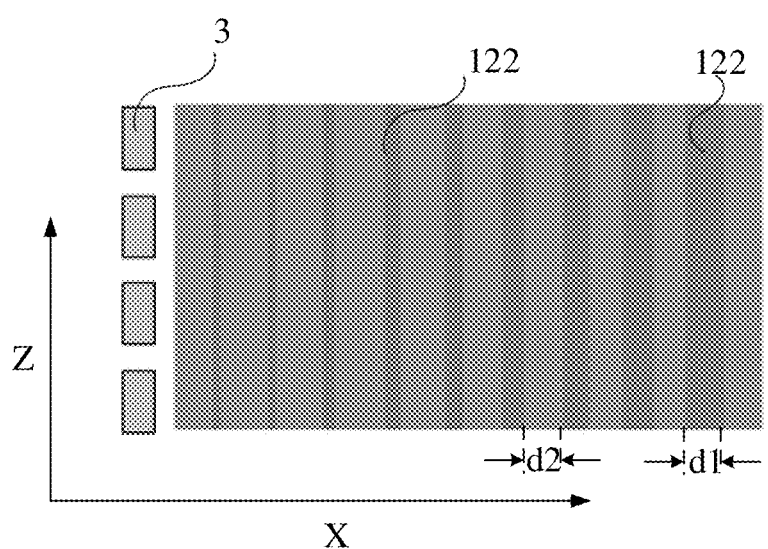
FIG. 4 is a schematic view of an arrangement of prisms provided by some embodiments of the disclosure.
Figure 5:
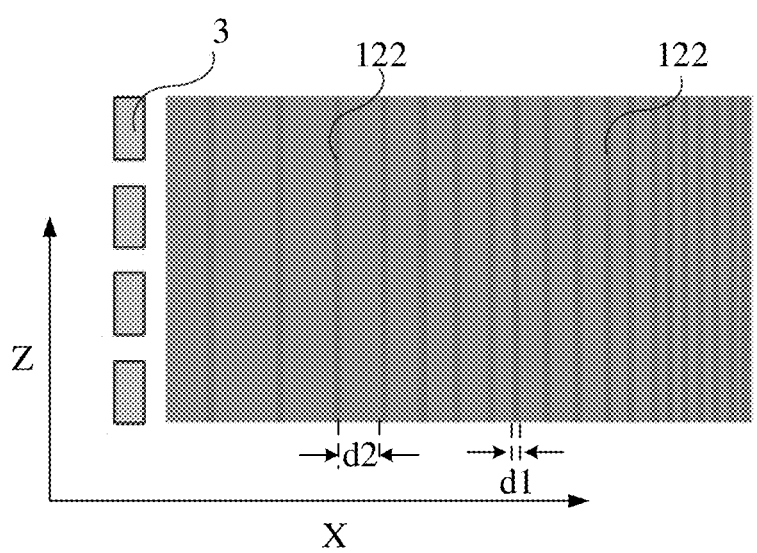
FIG. 5 is a schematic view of another arrangement of prisms provided by some embodiments of the disclosure.

As shown in FIGS. 4 to 6, in some embodiments of the present disclosure, the prism 122 has a columnar structure, and the prism 122 extends in the third direction Z, wherein the third direction Z is perpendicular to both the first direction X and the second direction Y. The sum of widths of orthographic projections of the third inclined surface 124 and the fourth inclined surface 126 on the body 121 of the light guide layer 12 in the first direction X is a width of the prism 122 in the first direction X. A distance between two adjacent prisms 122 in the first direction X is a space between two adjacent prisms 122.

In some embodiments, as shown in FIG. 4, the widths d1 of the plurality of prisms 122 in the first direction gradually increase in the first direction X, and the widths of the prisms 122 distal to the light source 3 is larger than that of the prisms 122 close to the light source 3.

In some embodiments, a distance d2 between two adjacent prisms gradually decreases in the first direction X, and a space between adjacent prisms 122 that are distal to the light source 3 is smaller than that of adjacent prisms 122 that are close to the light source 3.

In some embodiments, the prism 122 is, for example, discontinuous, and the prism 122 is a long cylindrical prism 122. As shown in FIG. 6, L1' is the width of the prism 122, and L2' is the length of the prism 122, where L1' is d1 shown in FIG. 2. As shown in FIG. 2, a side light source 3 is provided on one side of the light guide plate 1, so that a brightness of an area of the light guide plate 1 distal to the light source 3 is lower than that of an area of the light guide plate 1 close to the light source 3. In some embodiments, as shown in FIG. 4, the width of the prism 122 which is distal to the light source 3 is greater than the width of the prism 122 which is close to the light source 3. By increasing the width of the prism 122 distal to the light source 3, the brightness of the area of the light guide plate 11 distal to the light source 3 is increased, so that the brightness of the light guide plate 11 is uniform. In some embodiments, as shown in FIG. 5, the distance between adjacent prisms 122 distal to the light source 3 may be set to be smaller than the distance between adjacent prisms 122 close to the light source 3. By increasing an arrangement density of the prisms 122 distal to the light source 3, the brightness of the area of the light guide plate 11 distal to the light source 3 is increased, so that the brightness of the light guide plate 11 is uniform. In some embodiments of the present disclosure, the prism 122 has a dot-mesh structure.

Figure 7:
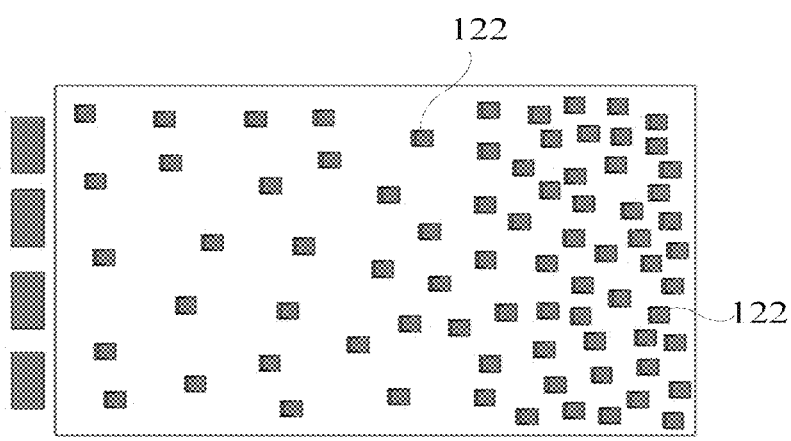
FIG. 7 is a schematic view of a further arrangement of prisms provided by some embodiments of the disclosure.
Figure 8:
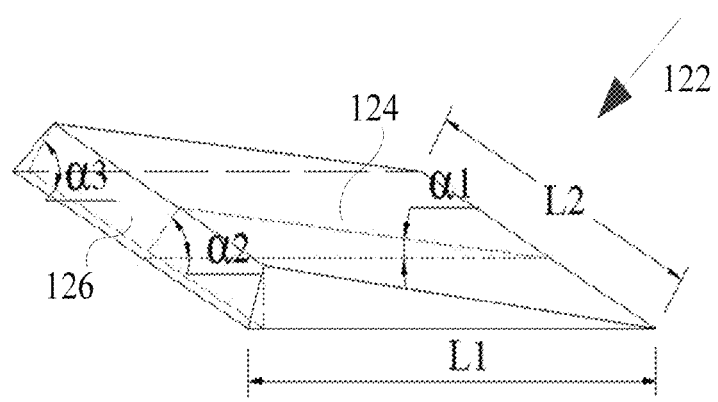
FIG. 8 is a schematic structural view of a prism with a dot-mesh structure provided by some embodiments of the disclosure.

In some embodiments, as shown in FIGS. 7 and 8, the prism 122 has a dot-mesh structure, and the arrangement of the dot-mesh structure is more free, so as to make the image more uniform. When the prism 122 of the light guide layer 12 has a dot-mesh structure, the uniformity of the image may be adjusted by arranging the dots. As shown in FIG. 7, when the prism 122 has a dot-mesh structure, the plurality of prisms 122 are distributed on the side of the light guide plate body 121 away from the second optical path control layer 14, and the distribution density of the prisms 122 gradually increases in the first direction, that is, the dot structure distal to the light source 3 is denser than the dot structure close to the light source 3. When the prism 122 has a dot-mesh structure, as shown in FIG. 8, the width of the prism 122 is L1, and the length of the prism 122 is L2. The prism 122 also includes a fifth inclined surface and a sixth inclined surface. Each of the fifth inclined surface and the sixth inclined surface intersects both the third inclined surface 124 and the fourth inclined surface 126. The fifth inclined surface faces the inside of the prism 122, and an included angle between the fifth inclined surface and the third bottom surface 127 is $\alpha 3$, $10°\leq \alpha 3 \leq 90°$, for example, $\alpha 3=90°$. The sixth inclined surface is opposite to the fifth inclined surface and has a similar structure, which will not be repeated here.

In some embodiments of the present disclosure, the light guide layer 12 and the first optical path control layer 16 are both formed of organic glass material or polycarbonate material.

In some embodiments, as shown in Table 1, values of respective parameters of the light guide plate 1 are shown. The light guide layer 12 and the first optical path control layer 16 are made of polycarbonate (PC) or organic glass. The thickness is 0.4 mm, the refractive index n1=n3=1.582, $\lambda=39.2°$. The prism 122 adopts a dot-mesh structure, the length and width of the prism 122 are L1 and L2 respectively, where L1=L2=40 µm, $\alpha 1=2°$, $\alpha 2=90°$. The second optical path control layer 14 is a UV glue with low refractive index, n2=1.337, $\gamma=90°$, $\beta=45.5°$. The theoretical deflection angle is equal to the actual deflection angle, and they may be equal to 124.31°, at this time $\sigma=0°$. In this way, the best anti-peeping effect is obtained. According to the law of refraction, the value of each angle in the process of light refraction may be calculated. Wherein, i+1 represents the number of times by which the light passes through the first side surface 164. As shown in Table 2, the light passes through the first optical path control layer 16 through four deflections. When the light is incident onto the first side surface 164 for the third time, $\theta 14=45.5°$, which satisfies the condition of total reflection (θ14>λ=39.2°, and the light is emitted from a front face of the light guide plate 11.

TABLE 1

| Material | n0 | n1 | n2 | n3 | α1 | γ | σ | θ5 |
|---|---|---|---|---|---|---|---|---|
| PC | 1 | 1.582 | 1.337 | 1.582 | 2 | 90 | 0 | 55.69 |

TABLE 2

| i | θ(6 + 4i) | θ(7 + 4i) | Δθ(1 + 2i) | θ(8 + 4i) | θ(9 + 4i) | Δθ(2 + 2i) | β | actual deflection angle | theoretical deflection angle |
|---|---|---|---|---|---|---|---|---|---|
| 0 | 10.185 | 16.24 | 6.06 | 28.25 | 17.41 | 10.84 | 45.50 | \ | 124.31 |
| 1 | 27.09 | 46.08 | 19.00 | −1.59 | −1.00 | −0.58 | \ | 142.73 | \ |
| 2 | 45.50 | \ | \ | \ | \ | \ | \ | 124.31 | \ |

Figure 9:
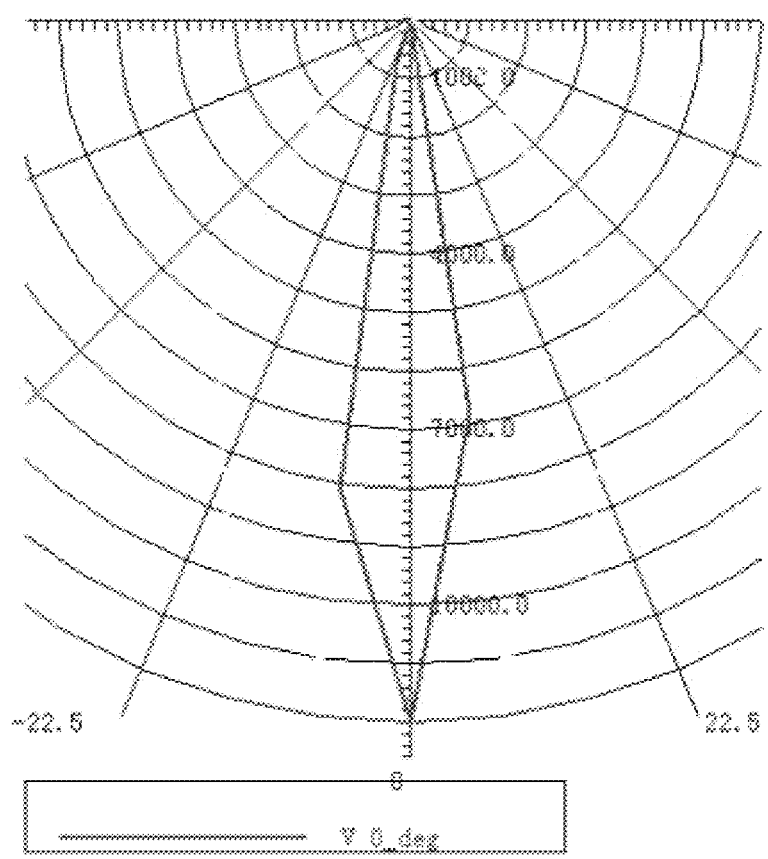
FIG. 9 is an angular brightness view of a simulation result of a backlight module provided by some embodiments of the disclosure.
Figure 10:
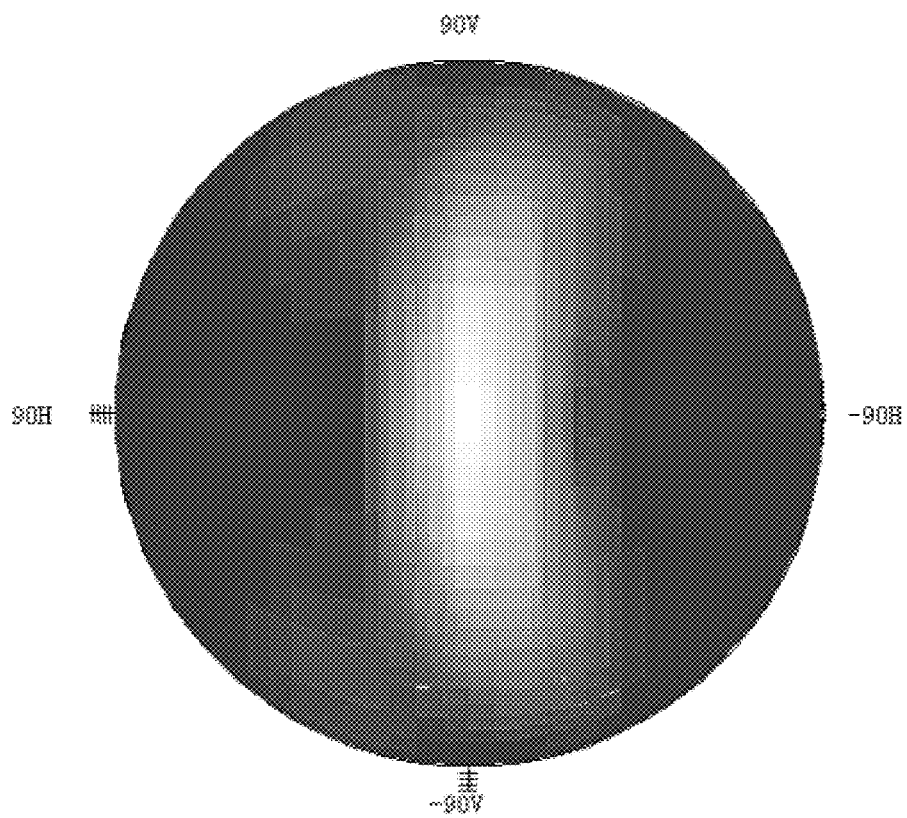
FIG. 10 is a grating view of a simulation result of a backlight module provided by some embodiments of the disclosure.

In some embodiments, an optical simulation model is built based on the above calculated parameters, and the simulation results are shown in FIG. 9 and FIG. 10. As shown in FIG. 9, a curve in the figure represents the brightness at viewing angles from −90° to 90°, and it can be seen that the half-brightness angle is ±10°, and the cut-off angle is ±20°. FIG. 10 is a grating view of an optical field. The brighter the color, the higher the brightness, that is, the brightness in a middle area is the largest, and the brightness in an area is gradually decreased as the area becomes farther away from the middle area. That is, the figure represents a situation in which the display device with the light guide plate 1 is viewed from various directions. The display device is the clearest only when it is viewed from the front side. Contents on a display panel may not be seen with a large viewing angle in the horizontal direction. The simulation result shows that the light has a good collimation by passing through the first optical path control layer 16, and proves the anti-peeping effect of the display device adopting the light guide plate of the present disclosure.

As shown in FIG. 1, in another aspect, the embodiments of the present disclosure provide a backlight module 100, which includes: the light guide plate 1 as described above; an side light source 3 disposed on the light incident surface 123 of the light guide layer 12; and a scattering control layer 2 located on a side of the light exit surface of the light guide plate 1. The scattering control layer 2 is configured to be switchable between a transparent state and an astigmatic state. When the scattering control layer is in the transparent state, light entering the scattering control layer 2 passes through the scattering control layer 2 without substantially changing its traveling direction. When the scattering control layer 2 is in the astigmatic state, the light entering the scattering control layer 2 is scattered by the scattering control layer 2 and then is emitted from the scattering control layer 2.

The backlight module 100 provided by the embodiments of the present disclosure includes all the technical features of the light guide plate 1 as described above, and therefore it has all the beneficial technical effects of the light guide plate 1 as described above, and will not be repeated here.

In some embodiments of the present disclosure, the scattering control layer 2 includes polymer dispersed liquid crystal (PDLC). The polymer dispersed liquid crystal (PDLC) includes liquid crystal molecules. The liquid crystal molecules are arranged in an orderly manner under the action of an external electric field, so that the scattering control layer 2 is in the transparent state. When the external electric field disappears, the liquid crystal molecules are arranged disorderly, so that the scattering control layer 2 is in the astigmatic state. That is, the scattering control layer is configured such that the scattering control layer is in the astigmatic state in response to no external electric field applied to the polymer dispersed liquid crystal; and the scattering control layer is in the transparent state in response to the external electric field applied to the polymer dispersed liquid crystal.

In some embodiments, as shown in FIG. 1, the backlight module 100 further includes a plastic iron frame 4, a light bar glue 5, a shading glue 6 and a circuit board 7. In addition, the side light source 3 is, for example, an LED light source 3, which is located on a side of the light guide plate 1. The scattering control layer 2 (for example, polymer dispersed liquid crystal (PDLC)) is located on the light exit side of the light guide layer 12 in the light guide plate 1. The light emitted from the light source 3 is guided by the light guide plate 1, passes through PDLC, and then enters the display panel on the light exit side of the backlight module 100, so that the display panel realizes the display function. The polymer dispersed liquid crystal (PDLC) includes liquid crystal molecules. When an external electric field is applied to the polymer dispersed liquid crystal (PDLC), the liquid crystal molecules in the polymer dispersed liquid crystal (PDLC) are arranged in an orderly manner and the optical axis direction of the liquid crystal molecules is parallel to an electric field direction of the external electric field. The refractive index of the liquid crystal molecules matches the refractive index of a matrix of the polymer dispersed liquid crystal (PDLC) to a certain extent, so that the polymer dispersed liquid crystal (PDLC) is transparent as a whole, and the backlight module 100 is in a light pointing mode, that is, the light emitted by the backlight module 100 is basically emitted in the first direction X. In this way, the display panel realizes the anti-peep function based on the light provided by the backlight module 100. When the external electric field is not applied to the polymer dispersed liquid crystal (PDLC), directions of the optical axis of the liquid crystal molecules in the polymer dispersed liquid crystal (PDLC) is random, and the liquid crystal molecules are in a disordered state. The light incident on the polymer dispersed liquid crystal (PDLC) is strongly scattered, and the polymer dispersed liquid crystal (PDLC) is in the astigmatic state. The light entering the PDLC is scattered by the PDLC itself and is emitted to the display panel. The display panel realizes a shared display function based on the light provided by the backlight module 100. The backlight module 100 is in a shared mode and does not have an anti-peep effect.

In another aspect, some embodiments of the present disclosure also provide a display device, including the backlight module 100 and a display panel as described above, and the display panel is located on the side of the light exit surface of the backlight module 100. The display device provided by the embodiments of the present disclosure includes all the technical features of the backlight module 100 as described above, and therefore has all the beneficial technical effects of the backlight module 100 as described above, and will not be repeated here.

Some embodiments of the present disclosure provide a light guide plate, a backlight module and a display device. The light guide plate includes a light guide layer, a first optical path control layer and a second optical path control layer. The light guide layer, the second optical path control layer, and the first optical path control layer are sequentially stacked from top to bottom. The second optical path control layer is disposed between the light guide layer and the first optical path control layer, and is used to bond the light guide layer and the first optical path control layer together. The light source is a side light source. The light source and the light guide layer in the light guide plate are located at substantially the same height. The light source emits light at a side closes to the light guide plate. The light may be incident onto a side of the light guide layer close to the second optical path control layer. The refractive index of the light guide layer is greater than the refractive index of the second optical path control layer. When the incident angle of the light incident on the side of the light guide layer close to the second optical path control layer is smaller than the total reflection angle at the interface between the light guide layer and the second optical path control layer, the light is refracted into the second optical path control layer. The refractive index of the second optical path control layer is smaller than or equal to the refractive index of the first optical path control layer, so that the light which is refracted into the second optical path control layer may be further refracted into the first optical path control layer. The plurality of prism structures are arranged on the side of the first optical path control layer distal to the second optical path control layer. After the light enters the first optical path control layer, it may be incident onto the prism structures. The prism structures are used to deflect the light so that the light exit direction faces toward the light exit surface of the light guide layer, that is, the exit direction is approximately perpendicular to the light exit surface. In this way, the light guide plate calibrates the divergent light through the first optical path control layer, and improves the light collimation of the exit light in one dimensional direction.

Therefore, the light guide plate provided by the present disclosure, through providing the prism structures in the first optical path control layer, enables the incident light to be deflected toward the light exit surface, so that the exit light is emitted toward the light exit surface, that is, the exit light exits in a direction approximately perpendicular to the light exit surface. In this way, the half-brightness angle and the cut-off angle are reduced, thereby realizing the anti-peep effect. Moreover, while the anti-peep effect is achieved, it is not necessary to coat the high-reflective film, thereby improving the production efficiency and reducing the production cost. Further, a problem that the high-reflective film may fall off when it encounters water may be avoided, thereby improving the product yield.

The above descriptions are only specific implementations of the present disclosure, but the protection scope of the present disclosure is not limited thereto. Those skilled in the art can easily think of changes or substitutions within the technical scope disclosed in the present disclosure, and these changes and substitutions shall fall within the protection scope of the present disclosure. Therefore, the protection scope of the present disclosure shall be defined by the claims.

What is claimed is:

1. A backlight module, comprising:
   a light guide plate, comprising: a first optical path control layer, a second optical path control layer, and a light guide layer that are sequentially stacked;
   wherein the light guide layer comprises a light incident surface and a light exit surface, and the light incident surface is configured such that light emitted from a light source enters the light guide layer through the light incident surface;
   wherein the first optical path control layer is disposed on a side of the light guide layer distal to the light exit surface, the second optical path control layer is disposed between the light guide layer and the first optical path control layer, and a plurality of prism structures are provided on a side of the first optical path control layer distal to the second optical path control layer;
   wherein the first optical path control layer, the second optical path control layer, and the light guide layer all extend in a first direction, the refractive index of the light guide layer is greater than the refractive index of the second optical path control layer, and the refractive index of the second optical path control layer is smaller than or equal to the refractive index of the first optical path control layer; and
   wherein the first optical path control layer is configured to deflect the light that enters the first optical path control layer from the light guide layer through the second optical path control layer, so that the deflected light passes through the second optical path control layer and is emitted from the light exit surface of the light guide layer, and an included angle between the light emitted from the light exit surface of the light guide layer and a second direction perpendicular to the first direction is smaller than a preset angle
   wherein the backlight module further comprises:
   a side light source facing the light incident surface; and
   a scattering control layer on a light exit side of the light guide plate,
      wherein the scattering control layer is configured to be switchable between a transparent state and an astigmatic state, light which enters the scattering control layer passes through the scattering control layer without substantially changing a traveling direction when the scattering control layer is in the transparent state, and the light which enters the scattering control layer is scattered by the scattering control layer and then exits from the scattering control layer when the scattering control layer is in the astigmatic state, wherein
      the first optical path control layer comprises a flat portion, the flat portion comprises a first surface close to the second optical path control layer and a second surface distal to the second optical path control layer, and the plurality of prism structures are arranged on the second surface;
      at least one of the plurality of prism structures has an inverted trapezoid shape and comprises a first bottom surface, a first side surface, and a second side surface, the first bottom surface and the second surface are coplanar, the first side surface is farther away from the light incident surface than the second side surface, a first included angle β between the first side surface and the first bottom surface is an acute angle, and a second included angle γ between the second side surface and the first bottom surface is an acute angle, wherein the first included angle β is smaller than the second included angle γ;

the at least one prism structure further comprises a second bottom surface on a side of the first bottom surface distal to the flat portion, and each of the first side surface and the second side surface intersects both the first bottom surface and the second bottom surface, wherein the range of the second included angle γ is 60°≤γ<90°; and the first side surface is configured to refract light refracted from the second optical path control layer such that the light is deflected toward the second optical path control layer to enter an adjacent prism structure; the second side surface is configured to refract light from another adjacent prism structure such that the light is deflected toward the light exit surface.

2. The backlight module according to claim 1, wherein the scattering control layer comprises polymer dispersed liquid crystal, the scattering control layer is in the astigmatic state in response to no external electric field applied to the polymer dispersed liquid crystal, and the scattering control layer is in the transparent state in response to the external electric field applied to the polymer dispersed liquid crystal.

3. A display device, comprising:
the backlight module according to claim 1; and
a display panel on a light exit side of the backlight module.

4. The backlight module according to claim 1, wherein a distance between the first bottom surface and the second bottom surface is between 34 μm and 51 μm.

5. The backlight module according to claim 1, wherein the plurality of prism structures are continuously arranged on the second surface.

6. The backlight module according to claim 1, wherein the plurality of prism structures and the flat portion are an integral structure.

7. The backlight module according to claim 1, wherein the light guide layer comprises a body of the light guide layer and a plurality of prisms arranged at intervals on the light exit surface of the light guide layer, and the prisms are arranged on a side of the body of the light guide layer distal to the second optical path control layer, and the prisms are configured to deflect light which propagates in the light guide layer by total reflection so that the light is refracted into the second optical path control layer.

8. The backlight module according to claim 1, wherein at least one of the light guide layer and the first optical path control layer is made of organic glass material or polycarbonate material.

9. The backlight module according to claim 1, wherein the second optical path control layer comprises water or salt water, and the light guide plate further comprises a sealant located between the light guide layer and the first optical path control layer; and the light guide layer, the first optical path control layer, and the sealant enclose an accommodating space, and the accommodating space is configured to seal and accommodate the water or salt water.

10. The light guide plate according to claim 1, wherein the second optical path control layer comprises a UV glue.

11. The backlight module according to claim 7, wherein at least one of the plurality of prisms comprises a third bottom surface, a third side surface, and a fourth side surface, the third bottom surface is parallel to and adjacent to the body of the light guide layer, the third side surface and the fourth side surface both intersect the third bottom surface, the third side surface is farther away from the light incident surface than the fourth side surface, a third included angle α1 between the third side surface and the third bottom surface is an acute angle, and a fourth included angle α2 between the fourth side surface and the third bottom surface is an acute angle or a right angle.

12. The backlight module according to claim 11, wherein the range of the third included angle α1 is 0.1°≤α1≤10°, and the range of the fourth included angle α2 is 60°≤α2≤90°.

13. The backlight module according to claim 11, wherein the plurality of prisms are elongated and all extend in a third direction perpendicular to both the first direction and the second direction, and the plurality of prisms are arranged at intervals in the first direction.

14. The backlight module according to claim 11, wherein the plurality of prisms have a mutually spaced dot-mesh structure, the plurality of prisms are distributed on a side of the body of the light guide plate distal to the second optical path control layer, and a distribution density of the prisms gradually increases in the first direction.

15. The backlight module according to claim 13, wherein distances between two adjacent prisms gradually decrease in the first direction.

16. The backlight module according to claim 13, wherein widths of the plurality of prisms in the first direction gradually increase in the first direction.

* * * * *